(12) United States Patent
Miller et al.

(10) Patent No.: US 6,660,640 B1
(45) Date of Patent: Dec. 9, 2003

(54) PROCESS FOR PLANARIZING PATTERNED METAL STRUCTURES FOR MAGNETIC THIN FILM HEADS

(75) Inventors: Robert Dennis Miller, San Jose, CA (US); Alfred Floyd Renaldo, San Jose, CA (US); Willi Volksen, San Jose, CA (US); Howard Gordon Zolla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 09/614,062

(22) Filed: Jul. 11, 2000

(51) Int. Cl.[7] .................. H01L 21/463; G11B 5/147
(52) U.S. Cl. ................... 438/693; 360/126; 216/90
(58) Field of Search ..................... 360/125, 126, 360/131, 135; 29/603.07, 603.14; 438/693, 691–692; 216/38, 52, 89–90

(56) References Cited

U.S. PATENT DOCUMENTS

| 5,490,028 A | 2/1996 | Ang et al. ................... 360/126 |
| 5,500,243 A | 3/1996 | Yang ........................ 427/126.3 |
| 5,673,474 A | 10/1997 | Watterstn et al. ......... 29/603.14 |
| 5,684,660 A | 11/1997 | Gray et al. ................... 360/126 |
| 5,748,417 A | 5/1998 | Malhotra et al. ............ 360/126 |
| 5,801,909 A | 9/1998 | Gray et al. ................... 360/126 |
| 5,815,909 A | 10/1998 | Gray ........................ 29/306.14 |
| 5,843,537 A | 12/1998 | Kim et al. ................... 427/504 |
| 5,853,558 A | 12/1998 | Gray et al. ................. 205/119 |
| 5,909,346 A | 6/1999 | Malhotra et al. ........... 360/126 |
| 5,936,813 A | 8/1999 | Kim et al. ................... 360/113 |
| 5,952,243 A * | 9/1999 | Forester et al. ............. 438/693 |

* cited by examiner

*Primary Examiner*—George J. Letscher
(74) *Attorney, Agent, or Firm*—Lumen Intellectual Property Services

(57) ABSTRACT

A process for planarizing a patterned metal structure for a magnetic thin film head includes the steps of applying an encapsulation/planarizing material on a substrate, spinning the substrate in a photoresist spinner or similar machine, curing the encapsulation/planarizing layer by energetic particles such as an electron beam. The planarizing process further comprises the step of polishing the entire structure using a conventional chemical-mechanical polishing step. The curing step takes place at the substrate temperature less than 200° C., which prevents the damages of the thin film head structures such as MR and GMR sensors. This process is cheap, efficient and easy to apply.

12 Claims, 3 Drawing Sheets

PROCESS FOR PLANARIZING PATTERNED METAL STRUCTURES FOR MAGNETIC THIN FILM HEADS

FIELD OF THE INVENTION

This invention relates generally to processes for the fabrication of thin film heads. More particularly, it relates to a process for planarizing a patterned metal structure for a magnetic thin film head.

BACKGROUND ART

In the continuing quest for increased storage density in magnetic media storage devices, magnetic thin film heads, such as magnetoresistive (MR) read/write heads or giant magnetoresistive (GMR) read/write heads, have been developed. As opposed to earlier types of magnetic heads, the fabrication of which involves significant piecework and manual handling of individual tiny components, thin film magnetic heads take advantage of semiconductor fabrication processes to form a large number of heads simultaneously on a common substrate or wafer.

In the prior art, sputtered amorphous aluminum oxide was used as a "backfill" material before planarizing thin film head structures. These structures are often several microns thick, requiring hours of time on expensive vacuum sputtering equipment prior to planarization.

Spin-on processes have been used in the fabrication of thin film magnetic heads to planarize and smooth-out pits on the substrate. The use of silicon dioxide, applied as a wet "spin on glass" (SOG), is employed similarly in the semiconductor industry. Spin-on glasses are conventionally heated to temperatures exceeding 300° C. to fully cure and harden the film.

U.S. Pat. No. 5,500,243, issued Mar. 19, 1996 to Danny D. L. Yang discloses a process for forming dielectric thin film coating on a substrate surface, which is suitable for use in magnetic thin film heads. The process of this Prior Art includes the application of a spin-on-glass (SOG) on a substrate, the spinning of the substrate, the preheating of the substrate and thin film to remove the solvents in the spin-on-glass material, and the heating in a reducing or in an inert atmosphere of the film to provide a conversion to a $SiO_2$ film. The preheating step requires a temperature in range from 250° C. and 330° C., and the heating step requires temperature in range from 900° C. and 1100° C. This process only applies for coating a substrate before making magnetic thin film heads. This high temperature processing currently with SOG prevents it from being used later in the process since thin film head structures such as magnetoresistive (MR) and giant magnetoresistive (GMR) sensors are readily damaged by such high temperature.

The process of curing an insulating layer of a thin film head by an electron beam is well known in the prior art. An article titled "Electron Beam Processing of Allied Signal Accuglass 211 SOG" published in Jun. 16, 1994 by Allied Signal Electron Vision Group teaches an electron beam process, a non-thermal method, for processing spin-on-glass materials. The electron beam process does not require, but may be used in conjunction with, active heating of the substrate and material to achieve the desired cure. However, such processes have not been used in fabrication of MR and GMR heads.

There is a need, therefore, for an improved fabricating process for magnetic thin film heads that is efficient and not operated at high temperatures to overcome the above difficulties.

OBJECTS AND ADVANTAGES

Accordingly, it is a primary object of the present invention to provide a process for planarizing patterned metal structures for magnetic thin film heads wherein:

1) the curing step is performed at temperature below 200° C., so the damaging of the magnetic thin film head is prevented
2) the cycle time is short
3) costs are reduced These and other objects and advantages will be apparent upon reading the following description and accompanying drawings.

SUMMARY

These objects and advantages are attained by a process for planarizing patterned metal structures for a magnetic thin film head.

According to a preferred embodiment of the present invention, an encapsulation/planarizing material is applied on the surface of a substrate and an unplanarized magnetic pole or other structure(s) of a magnetic thin film head. The encapsulation/planarizing material typically includes silicon, oxide, aluminum oxide, titanium oxide or zirconium oxide, or inorganic or inorganic/organic polymers, which crosslink upon exposure to the energetic particles. Alternatively, the encapsulation/planarizing material may include high temperature croslinking organic polymers.

The substrate with applied encapsulation/planarizing material is spun in a photoresist spinner with a speed between about 1000 RPM and about 4000 RPM, for a time within the range of approximately 20 seconds to 180 seconds, at room temperature. After the spin-on step, the encapsulation/planarizing material is fully densified and cured using energetic particles such as electrons or photons. The curing step takes place at the substrate temperature less than 200° C., for a time within the range of approximately 1 minute to 20 minutes. The cured encapsulation/planarizing layer is denser than the pre-cured material, resulting in a thinner layer than the initially applied encapsulation/planarizing layer. Finally, the entire structure is polished down to a level that exposes the magnetic poles or other structures in the thin film head.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
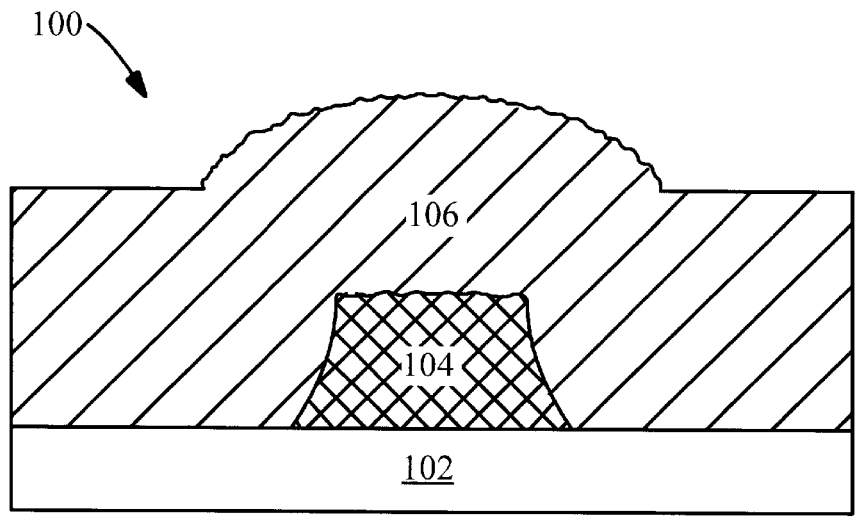
FIG. 1A shows a cross-sectional view of a thin film head structure with an applied uncured encapsulation/planarizing material layer according to a preferred embodiment of the present invention.

FIG. 1A shows a cross-sectional schematic diagram of a thin film head structure 100. The thin film head structure 100 includes a substrate 102 and an unplanarized feature(s) 104, such as a magnetic pole, coil, head, sensor or test pad, disposed on the substrate 102 or on other features. The spin-on coating, in accordance with the present invention, is prepared as shown in FIG. 1A. A layer 106 of encapsulation/planarizing material is applied on top of the substrate 102 and the magnetic pole 104. The encapsulation/planarizing material in layer 106 typically includes silicon oxide, aluminum oxide, titanium oxide, tantalum oxide or zirconium oxide.

The applicable materials for encapsulation/planarizing layer 106 are predominantly inorganic and inorganic/organic polymers which crosslink upon exposure to the energetic particles. These spin-on-glass (SOG) and spin-on-glass polymers (SOG-P) are derived from sol-gel processes of hydrolysis of orthosilicate esters or co-hydrolysis of orthosilicates with aryl or alkyl substituted silyl precursors, and organosubstituted silicates containing one or two organic substituents such as hydrido, linear alkyl, branched alkyl, fluoroalkyl, aryl, arylalkyl, heteroaromatic and others. The leaving groups in the hydrolysis are substituents such as hydroxy, alkoxy, halo, acetoxy, sulfonate, fluorosulfonate and others. Other multifunctional hydrolytically labile precursors derived from Al, Ti, Zr, or Ta may be either used alone or in conjunction with the silicon derivatives to impart the desired film properties. Many suitable commercially prepared SOG and SOG-P materials are available such as the materials provided by Hitachi Chemical under the trade designations HSG-300X and HSG-R7.

Silsesquioxane (SSQ) prepolymers $(RSiO_{1.5})_n$ are useful and are available with a wide variety of substituents. Commercial materials are available from Techniglas under the trade designations GR100, GR150F, GR630, GR650, GR908F, GR950F and others, or from Honeywell under the trade designations HOSP, T-11, T-12, T-14, T-24 etc., or from Filmtronics Corp., and Dow Corning. Hydridosilsesquioxane is available from Dow Corning under trade designation FOx. Custom synthesis of SOGs, SSQs, and hybrid varients are performed by Silicon Research Association, Dow Corning and others. Examples of samples containing small particles of silicon oxide, aluminum oxide, zirconium oxide, titanium oxide, and tantalum oxide constitute filled examples of the above.

Alternative materials for encapsulation/planarizing layer 106 include high temperature crosslinking organic polymers including poly(arylene ethers) available from FLARE-Honeywell and VELOX Schumaker/Air Products, polyarylenes available from Silk-Dow Chemical, polybenzocyclobutenes available from CYCLOTENE-Dow Chemical, functionalized poly(norbonenes) available AVATREL-BFGoodrich, and others. Some of these polymers contain deliberately introduced reactive functionality while others are intrinsically prone to crosslinking with ionizing radiation. Other examples include inorganic-organic hybrids containing vinyl addition polymers with caged silicon pendant substituents, which available from Hybrid Plastics. The encapsulation/planarizing layer 106 may also include soluble polyimides, which are low molecular weight oligomers functionalized at the chain ends with crosslinkable functional groups such as ethynyl, arylethynyl, benzocyclobutenyl, triakoxy and others. Alternatively, the encapsulation/planarizing layer 106 may include fully cyclized soluble condensation polymers, such as polybenzoimidazoles, polybenzoxazoles, polybenzothiazoles, polyquinolines, polyquinoxalines and the like, with the crosslinkable functional groups substituted either in the main chain or at the chain ends of the polymers. Precursor polymers, such as polyamic acids, polyamic esters, polyisoimides and others, may be used to make encapsulation/planarizing layer 106 as long as cyclocondensation is initiated with crosslinking upon treatment with ionizing radiation.

After application of the encapsulation/planarizing layer 106, the substrate 102 and the encapsulation/planarizing layer 106 are spun in a photoresist spinner or a similar machine with a speed of between about 1000 RPM and about 4000 RPM, for a time within the range of approximately 20 seconds to 180 seconds, at room temperature to spread the encapsulation material uniformly over the substrate. The overall thickness of the encapsulation/planarizing layer 106 will depend on the properties of the applied spin-on solution. The thin film head structure 100 is dried at low temperature about 85° C. to 150° C. on a hot plate or in an oven.

Figure 1B:
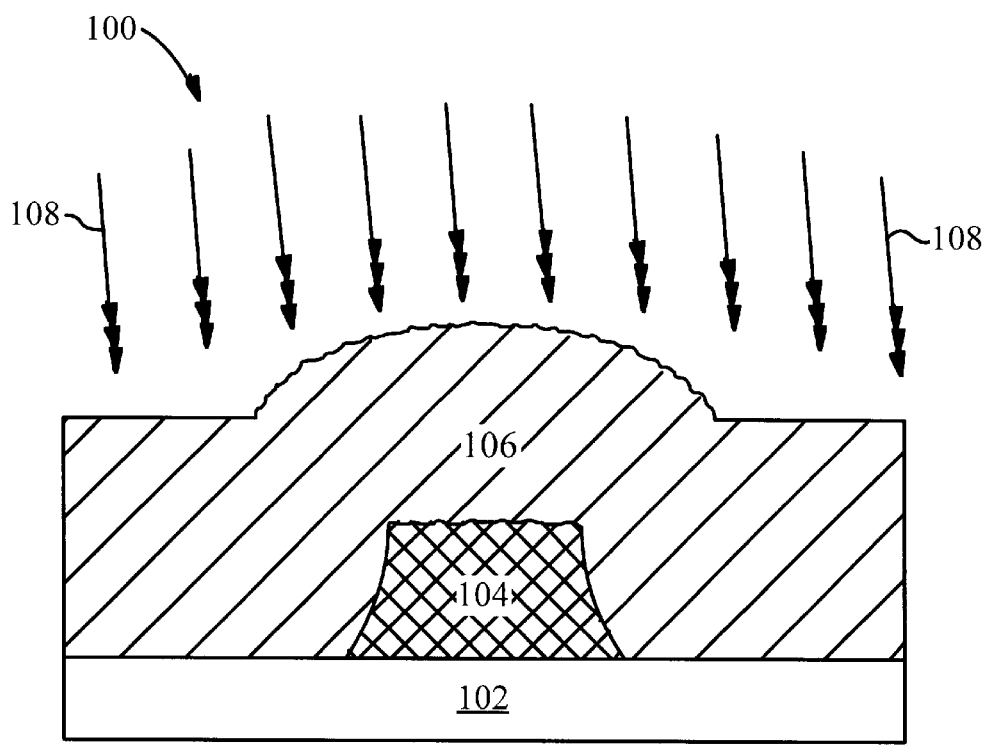
FIG. 1B shows a cross-sectional view of the thin film head structure illustrated in FIG. 1A wherein the encapsulation/planarizing layer is cured by an electron beam.
Figure 1C:
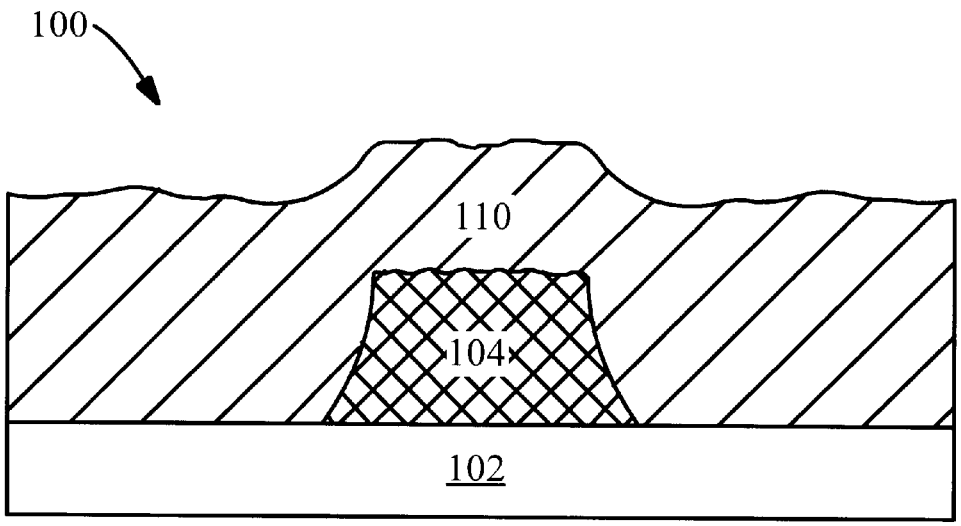
FIG. 1C shows a cross-sectional view of the thin film head structure illustrated in FIG. 1B with a cured encapsulation/planarizing layer.

After spin-on application, the encapsulation/planarizing layer 106 is densified and cured by energetic particles 108 as shown in FIG. 1B. Suitable energetic particles 108 include electrons and photons. For the purposes of the present application, photons include various forms of electromagnetic radiation, such as microwave, infrared, visible, ultraviolet, x-ray and the like. For example, the encapsulation/planarizing layer 106 may be exposed to electrons at an energy of 3 keV to 20 keV and a current density of between about 1 $mC/cm^2$ and about 10 $mC/cm^2$, for approximately 1 minute to 20 minutes. Electrons may be provided by an electron beam apparatus such as an ElectronCure 30 system from Electron Vision, a plasma, or other similar means. During the curing process the substrate 102 typically has a temperature less than 200° C. The energetic particle treatment cures encapsulation/planarizing layer 106 to form a cured encapsulation/planarizing layer 110 as shown in FIG. 1C. The cured encapsulation/planarizing layer 110 is denser and therefore thinner than the uncured encapsulation/planarizing layer 106 of FIG. 1B. The thickness of the encapsulation/planarizing layer 110 is typically within the range of 1 micron to 10 microns.

The electron beam exposure may be incorporated with simultaneous heating for maximum effect. The actual temperature can be compatible with the build. Also, certain materials such as the SOGs, SOG-Ps, SSQs etc. can also be cured with vacuum UV radiation (172 nm, 157 nm) since the are somewhat optically transparent at the wavelengths. In a specific embodiment, this may be done with methyl SSQ. The organic polymers, by contrast, tend to be so optically opaque at these wavelengths that the penetration depth is quite small. This may be less of a problem with x-ray.

Figure 1D:
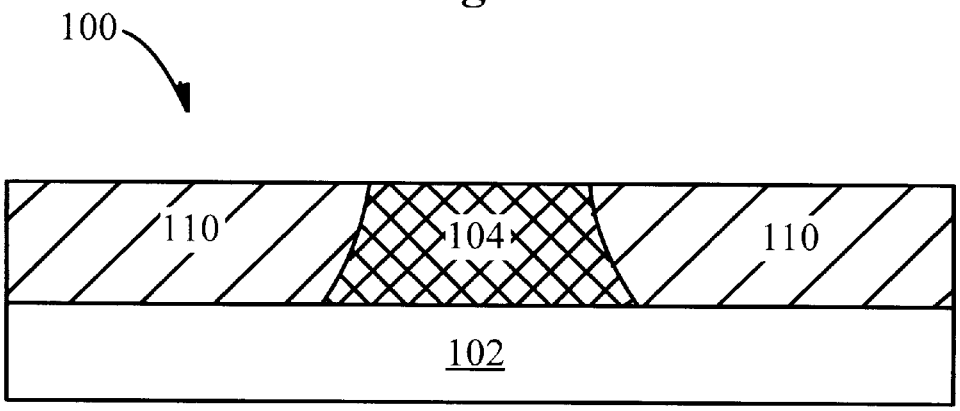
FIG. 1D shows a cross-sectional view of the thin film head structure illustrated in FIG. 1C after a chemical-mechanical polishing.

The thin film head structure illustrated in FIG. 1C is polished to expose magnetic pole 104 or other structures as shown in FIG. 1D. The thin film head structure 100 may be planarized using a conventional process such as mechanical of chemical-mechanical polishing (CMP).

The process for planarizing patterned metal structures for magnetic thin film heads as described in FIGS. 1A–1D above can produce films containing absorbed water between about 0.1% and about 1%. Such low water content renders the films more chemically inert and less likely to cause corrosion of metal layers, which are being planarized by these films. Additionally, the process as described in FIGS. 1A–1D above may be used in any instance in the recording head where an insulator is currently used, such as undercoat, gaps, encapsulating layers, and electrical isolation layers.

Figure 2:
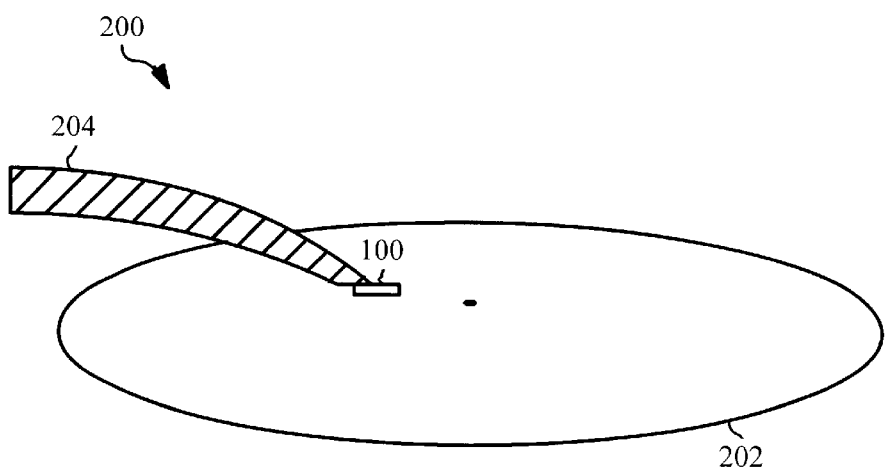
FIG. 2 shows a schematic diagram of a disk drive system including a thin film magnetic head of the type illustrated in FIG. 1D.

The magnetic thin film head structure 100 described above may be incorporated into a disk drive system 200 as shown in FIG. 2. The disk drive system 200 generally comprises a magnetic recording disk 202, a magnetic thin film head 100, and an actuator 204 connected with the magnetic thin film head 100. The actuator 204 moves the magnetic thin film head 100 across the magnetic recording disk 202 so the magnetic thin film head 100 may access different regions of magnetically recorded data on the magnetic recording disk 202.

It will be clear to one skilled in the art that the above embodiment may be altered in many ways without departing from the scope of the invention. Accordingly, the scope of the invention should be determined by the following claims and their legal equivalents.

What is claimed is:

1. A process for planarizing a patterned metallic structure for a magnetic thin film head comprising the steps of:

a) applying an encapsulation/planarizing material over a patterned structure on a surface of a substrate;

b) curing the encapsulation/planarizing material with energetic particles;

c) polishing the encapsulation/planarizing material;

wherein the encapsulation/planarizing material is selected in combination with said curing such that an absorbed water content of said encapsulation/planarizing material is between 0.1% and 1% rendering the cured encapsulation/planarizing material chemically inert and such that a corrosion of the patterned metallic structure is prevented.

2. The process of claim 1, wherein the polishing step is a chemical-mechanical polishing (CMP) process.

3. The process of claim 1 further comprising a step of spinning the substrate to spread the encapsulation/planarizing material.

4. The process of claim 3, wherein the spinning step is carried out in a photoresist spinner.

5. The process of claim 1, wherein the energetic particles are electrons.

6. The process of claim 5, wherein the electrons are delivered to the encapsulation/planarizing material in the form of an electron beam.

7. The process of claim 1, wherein the energetic particles are photons.

8. The process of claim 7, wherein the energetic particles are infrared, ultraviolet, visible, microwave, or x-ray radiation.

9. The process of claim 1, wherein the curing process takes place at a substrate temperature less than a temperature at which damage will occur to the thin film head.

10. The process of claim 1, wherein the encapsulation/planarizing material comprises high temperature crosslinking organic polymers.

11. The process of claim 1, wherein the encapsulation/planarizing material comprises an insulating material selected from the group consisting of inorganic and inorganic/organic polymers, which crosslink upon the exposure to the energetic particles.

12. The process of claim 1 is applied on an undercoat, gaps, encapsulating layers, and electrical isolation layers of a recording head, where an insulator is currently used.

* * * * *